United States Patent [19]

Nelson et al.

[11] Patent Number: 4,585,803

[45] Date of Patent: Apr. 29, 1986

[54] INTERNAL MOLD RELEASE COMPOSITIONS

[75] Inventors: Donald L. Nelson, Lake Jackson, Tex.; Roney J. Matijega, Midland; Dennis P. Miller, deceased, late of Midland, both of Mich., by Marilyn M. Miller, administrator

[73] Assignee: The Dow Chemical Company, Midland, Mich.

[21] Appl. No.: 641,883

[22] Filed: Aug. 17, 1984

[51] Int. Cl.$^4$ .............................................. C08G 18/14
[52] U.S. Cl. .................................. 521/105; 106/38.22; 106/38.24; 521/107; 521/115; 521/118; 521/124; 521/125; 524/701; 524/707; 524/718; 524/724

[58] Field of Search ...................... 252/32.5, 33.6, 34, 252/34.7, 37, 39, 41, 42, 42.1, 42.4, 182; 521/105, 107, 118, 115, 124, 125

[56] References Cited

U.S. PATENT DOCUMENTS 3,262,889  7/1966  Edwards et al. ...................... 252/37
3,767,743 10/1973  Hostettler et al. .................. 521/124

*Primary Examiner*—Maurice J. Welsh
*Attorney, Agent, or Firm*—Gary C. Cohn

[57] ABSTRACT

Internal mold release compositions suitable for use in preparing polyurethane and polyurea moldings comprise a tertiary amine compound, a metal salt of a carboxylic acid, amidocarboxylic acid, phosphorus-containing acid or boron-containing acid. The metal is from Group IA, IB, IIA, or IIB metal or aluminum, chromium, molybdenum, iron, cobalt, nickel, tin, lead, antimony or bismuth.

31 Claims, No Drawings

INTERNAL MOLD RELEASE COMPOSITIONS

BACKGROUND OF THE INVENTION

This invention relates to internal mold release compositions and to polyahl compositions containing same, as well as a process for preparing polymers in the presence of internal mold release compositions.

Polyurethane and/or polyurea moldings are being increasingly used in the manufacture of automobiles, furniture and in-home construction. Molded polyurethanes and polyureas are especially important because they are light weight, resistant to moisture, weather, temperature extremes and aging. For example, molded polyurethane elastomers have become of special interest in the manufacture of force-reducing impact media such as safety impact bumpers for automobiles.

The demand for molded polyurethane articles requires that they be produced in the largest numbers in the shortest possible time. Polyurethane forming mixtures are imminently suited for mass production because the reactants are liquid and are quick reacting. However, the problem has existed in removing the molded polyurethane article from the mold. Heretofore, release of molded articles from molds in which they have been formed has been achieved by coating the surface of the mold cavity with an agent which facilitates the release of the article from the walls of the mold cavity. Procedures such as this are described in U.S. Pat. Nos. 3,964,530; 3,640,769; 3,624,190; 3,607,397 and 3,413,390. Such external mold releases have several disadvantages. For example, the external mold release tends to cling to the molded part upon release from the mold thereby requiring that the external mold release agent be reapplied almost each time the mold is used. In applying the external mold release, it is critical to uniformly coat the entire mold surface to prevent the molded part from sticking to the mold. The need to repeatedly treat the mold and the care required in such treatment, add substantially to the expense and time required to mold polyurethanes.

An additional problem is that residue from the external mold release builds up as the mold is repeatedly used. This build-up eventually covers and obscures details on the mold cavity surface desirably imparted to the molded article. If severe enough, this residue can cause a loss of critical part dimensions. Thus, the build-up must be periodically removed from the mold, resulting in additional system downtime. The use of too much of an external mold release can lead to attack on the polymers by solvents contained in the external mold release formulation.

Further, the use of sprayed on external mold release, especially those containing solvent, have related environmental safety and/or hygiene disadvantages.

The use of internal mold release agents for use in molding polyurethane articles has been disclosed in U.S. Pat. Nos. 3,726,952; 4,024,088; 4,098,731; 4,130,698; 4,111,861; 4,201,847 and 4,220,727.

Various problems have arisen with the use of such internal mold release agents. Many bleed or creep to the surface of the molded article, thereby interfering with the article's ability to be painted. Other internal mold release agents are incompatible with polyols used in forming the polyurethane. Many seriously reduce the activity of the catalysts used in the reaction mixture. In addition, many cause a reduction in the physical properties of the molded polyurethane.

More recently, in copending application Ser. No. 570,141, filed Jan. 12, 1984, an internal mold release agent comprising a primary or secondary amine and a metal salt of certain acids has been disclosed. Although the internal mold release agent overcomes the problems associated with earlier mold release agents, it is often too reactive due to the presence of primary or secondary amines to be of optimum utility in certain polyurethane formulations.

Despite these difficulties, it is desirable to provide an internal mold release agent for polyurethane moldings. Such internal mold release agents substantially reduce the time and cost of preparing molded polyurethanes and similar polymers. It would be desirable, therefore, to provide a mold release agent which provides for increased mold release of polyurethane moldings from mold cavities, increases the ease in which the molded part is demolded, does not significantly adversely effect the catalytic reactivity, which minimally alters the physical properties of the molded polyurethane, and/or is not too reactive for optimum utility in polyurethane formulations.

SUMMARY OF THE INVENTION

This invention is such an internal mold release composition. The internal mold release (IMR) composition comprises (a) a metal salt of a carboxylic acid, amido carboxylic acid, phosphorus-containing acid or boron-containing acid wherein (1) the acid contains at least one lipophilic group which renders it incompatible with an active hydrogen containing composition and (2) the metal is chosen from those metals in Groups IA, IB, IIA and IIB of the Periodic Table of the Elements, aluminum, chromium, molybdenum, iron, cobalt, nickel, tin, lead, antimony and bismuth and (b) a compatibilizing amount of an organic compound containing at least one tertiary amine group, which compound is a compatibilizer for said metal salt in an active hydrogen-containing composition but does not compatibilize the metal salt in a reacting mixture comprising said active hydrogen containing composition and a polyisocyanate.

In another aspect, this invention is an active hydrogen-containing composition comprising (a) at least one polyahl and (b) an effective amount of the internal mold release (IMR) composition of this invention.

In a further aspect, this invention concerns an improvement in a process for preparing molded polyurethane and/or polyurea and like polymers, which process comprises reacting in a suitable mold a mixture of a polyisocyanate or a polyisothiocyanate "A side" component and an active hydrogen-containing "B side" component. The improvement resides in conducting said reaction in the presence of the internal mold release (IMR) composition of this invention.

The IMR release composition of this invention effectively reduces the adhesion of a molded polyurethane to the walls of the mold cavity in which it is formed. Accordingly, the molded polyurethane is more easily and/or more quickly removed from the mold. The internal mold release composition of this invention has the further advantages of not significantly effecting the activity of the catalyst(s) used in the reaction of a polyisocyanate and an active hydrogen-containing composition, providing for the formation of numerous molded parts without requiring repeated treatments of the mold and providing moldings having surfaces which are readily painted or otherwise coated if desired.

DETAILED DESCRIPTION OF THE INVENTION

The internal mold release (IMR) composition of this invention comprises a metal salt of an organic acid and a tertiary amine compound which is a compatibilizer for the metal salt in an active hydrogen containing mixture but does not significantly compatibilize the metal salt in a reacting mixture comprising the active-hydrogen-containing composition and a polyisocyanate. The IMR composition of this invention contains sufficient of the tertiary amine to compatibilize the metal salt in an active hydrogen-containing composition.

The tertiary-amine compound useful herein is any which contains at least one tertiary amine atom and is a compatibilizer for the metal salt in an active hydrogen-containing composition but not in a reaction mixture comprising said active hydrogen containing composition and a polyisocyanate.

The ability of a particular tertiary amine to compatibilize the metal salt is readily determined by blending the metal salt with the tertiary amine compound and then mixing the resulting blend with an active hydrogen-containing composition. Compatibilization is achieved when the blend is dissolved or suspended in the active hydrogen containing composition for a time sufficiently long to permit it to be reacted with a polyisocyanate. The inability of a tertiary amine to compatibilize the metal salt in a reacting mixture of the active hydrogen-containing mixture is evidenced by a reduction in the time and effort required to remove the molded article from the mold.

The tertiary amine compound advantageously contains one or more alkanol or hydroxy-terminated poly(oxyalkylene) groups attached to a tertiary nitrogen atom. The presence of such groups often tends to increase the ability of the tertiary amine to compatabilize the metal salt.

When the tertiary amine compound is a mono-amine, there are preferably at least two alkanol or hydroxy-terminated poly(oxyalkylene) groups attached to the nitrogen atom. Preferably, such mono-amine is an alkylene oxide adduct of ammonia or a primary amine as represented by the structure $$R'_{(3-n)}N[(CH_2CHRO)_xH]_n \quad (I)$$

wherein x is a number from about 1–5, preferably 1–3, more preferably 1, n is 2 or 3, each R is independently hydrogen, halogen or inertly substituted lower alkyl and R' is an inertly substituted lower alkyl or aromatic group. In such monoamine, the structure of the group R may depend on the composition of the active hydrogen-containing composition into which the IMR composition is used. For example, when the active hydrogen-containing composition comprises a polyether polyol having a substantial proportion of repeating units derived from propylene oxide, a substantial proportion of the groups R are advantageously lower alkyl, preferably methyl. Similarly, if a poly(ethylene oxide)polyol is used, a substantial proportion of the R groups are advantageously hydrogen. Preferred monoamines include tri(isopropanol)amine, methyl di(isopropanol)amine, ethyl di(isopropanol)amine, phenyl di(isopropanol)amine, triethanol amine, methyl diethanol amine, adducts of ammonia with about 4–9 moles of propylene oxide, and the like.

Also suitable as the monoamine are hydroxyalkyl or hydroxy terminated poly(oxyalkylene) derivatives of cyclic amines, such as N-hydroxypropyl morpholine, N-hydroxyethylmorpholine, and the reaction products of cyclic amines such as morpholine with from about 2–30 moles of ethylene oxide, propylene oxide or mixtures thereof, and the like.

Preferably, the tertiary amine compound contains two or more tertiary nitrogen atoms. Suitable diamines include those represented by the structure

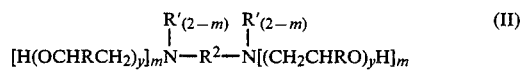

and

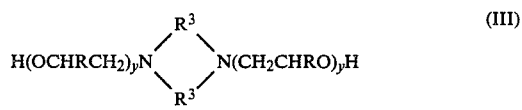

wherein $R^2$ is an inertly substituted alkylene, dialkylene ether or polyether diradical, each y is independently a number from about 1–50, preferably 1–20, l more preferably 1–5 and most preferably 1–3, each m is independently 1 or 2, preferably 2, each $R^3$ is independently an inertly substituted alkylene diradical and R and R' are as defined hereinbefore.

Suitable di-tertiary amines according to structure (II) include those obtained by reacting an alkylene diamine, N-hydroxyalkyl alkylene diamine, or amine-terminated polyether with from about 1–50, preferably 1–20, more preferably 1–5 and most preferably 1–3 moles of an alkylene oxide per amine hydrogen. Suitable amine-terminated polyethers to be used as starting materials include those described in U.S. Pat. Nos. 3,654,370 and 3,666,788, preferably those having a molecular weight from about 60–2000, more preferably 60–1000, and most preferably 60–500. Suitable alkylene diamines useful as starting materials include those in which the alkylene group is straight chained or branched and have from about 1–30, preferably 2–5, more preferably 2–3 carbon atoms. The alkylene oxide is preferably ethylene oxide, propylene oxide or butylene oxide or mixtures thereof. Most preferred are the reaction product of ethylene diamine with 4–12 moles of propylene oxide or a mixture of propylene oxide and ethylene oxide, and hydroxyethyl ethylene diamine reacted with 3–9 moles of propylene oxide or a mixture of propylene oxide and ethylene oxide.

Suitable diamines according to structure (III) include the reaction products of piperazine and about 2–6, preferably about 2 moles of a $C_2$–$C_4$ alkylene oxide, which is preferably propylene oxide or mixtures containing propylene oxide.

Other suitable tertiary amines include, for example, alkylene oxide adducts of aminoalkyl piperazine, i.e. those represented by the structure

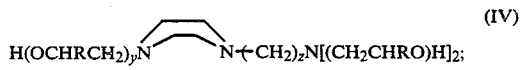

$C_2$–$C_4$ alkylene oxide adducts of bis(aminoalkyl)piperazine, i.e.

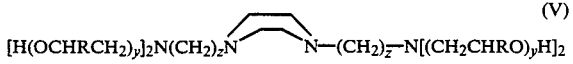
(V)

wherein z is a number from about 1–10, preferably 1–3, more preferably 2–3; N,N',N" trihydroxyalkyl triazines, i.e.

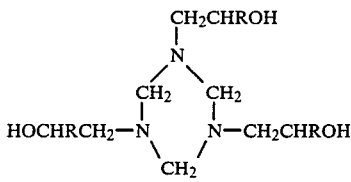
(VI)

and poly(alkylene amines) which are reacted with about 1–3, preferably about 1 mole of a $C_2$–$C_4$ alkylene oxide per amine hydrogen.

It will be noted that the hydroxyl-terminated tertiary amines will react with a polyisocyanate to form a polyurethane polymer. Thus, in those instances, the IMR composition of the invention can, if desired, be reacted with a polyisocyanate to form a polyurethane. However, it is normally desirable to employ different polyahls having no tertiary amine groups in the polyahl formulation, and the IMR composition of this invention is most typically mixed with at least one such polyahl.

The internal mold release (IMR) composition of this invention also requires a metal salt of a carboxylic acid, an amido carboxylic acid, a phosphorus-containing acid or a boron-containing acid which acid contains at least one lipophilic group which renders it incompatible with a polyahl in which the IMR composition of this invention is employed. The acid salt used herein advantageously contains at least one polysiloxane chain or a saturated or unsaturated inertly substituted hydrocarbyl group containing at least seven carbon atoms.

Suitable carboxylic acids which can be employed herein as a component in the internal mold release composition include saturated or unsaturated aliphatic or cycloaliphatic carboxylic acids or aromatic carboxylic acids; preferably those carboxylic acids having from about 7 to about 30, preferably from about 10 to about 18, carbon atoms.

Preferably the acid is a so-called "fatty acid" having from about 10 to 18 carbon atoms. Such fatty acids include, for example, oleic, stearic, lauric, palmitic, linoleic, ricinoleic and like acids as well as mixtures thereof.

Suitable carboxylic acids include amido-containing carboxylic acids such as the reaction products of carboxylic acid halides containing from 1 to 30, preferably from 2 to 18, more preferably from 5 to 18, carbon atoms with an amino carboxylic acid having from 2 to 4, preferably from 2 to 3, carbon atoms per molecule.

Particularly suitable such amine containing carboxylic acids include those represented by the general formula

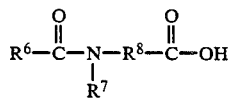

wherein $R^6$ is a hydrocarbon or substituted hydrocarbon group having from 1 to 29, preferably from 2 to 17, carbon atoms; $R^7$ is hydrogen, an alkyl or hydroxyl substituted alkyl group having from 1 to 3 carbon atoms and $R^8$ is a divalent hydrocarbon group having from 1 to 3, preferably 1, carbon atoms. Exemplary such amine-containing carboxylic acids include, for example, oleoyl sarcosine, lauryl sarcosine, capryl sarcosine, oleoyl glycine, octanol glycine, oleoyl hydroxyethyl glycine, and mixtures thereof. These amido carboxylic acids can be prepared by the Schotten-Baumann acylation reaction wherein an acyl halide is reacted with an amino acid.

Also suitable as carboxylic acids are those represented by the formula

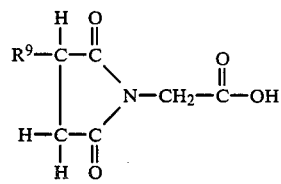

wherein $R^9$ is a hydrocarbyl group having from 1 to about 12 carbon atoms.

Suitable materials containing at least one carboxylic acid group and containing siloxane chains include those described by J. W. Keil in U.S. Pat. No. 4,076,695.

Suitable organic materials containing at least one phosphorus-containing acid group include, for example, monostearyl acid phosphate, cetyl dihydrogen phosphate, monolauryl phosphate, decyl dihydrogen phosphate, monobutyl monodecyl ester of phosphoric acid, and mixtures thereof.

Suitable organic materials containing at least one boron-containing acid group include, for example, dioctadecyl ester of boric acid, monododecyl mono(phenylmethyl)ester of boric acid, monododecyl monophenyl ester of boric acid, monoheptadecyl mono(phenylmethyl)ester of boric acid, monodecyl ester of boric acid, and mixtures thereof.

Suitable metal salts of the aforementioned acids include those wherein the metal is selected from Groups I or II of the Periodic Table of the Elements, aluminum, chromium, molbydium, iron, cobalt, nickel, tin, lead, antimony or bismuth. Preferably the metal is lithium, sodium, potassium, copper, magnesium, calcium, barium, zinc, cadmium, aluminum, chromium, iron, cobalt, nickel, tin, lead, antimony, or bismuth or combinations thereof. More preferably the metals are lithium, copper, magnesium, calcium, barium, zinc, cadmium, aluminum, iron, cobalt, or nickel or combinations thereof. Most preferred are zinc, calcium, magnesium and nickel.

Particularly suitable metal acid salts include, for example, zinc stearate, zinc oleate, zinc palmitate, zinc laurate, calcium stearate, calcium oleate, calcium palmitate, calcium laurate, magnesium stearate, magnesium oleate, magnesium laurate, magnesium palmitate, nickel stearate, nickel oleate, nickel palmitate, nickel laurate, copper stearate, copper oleate, copper laurate, copper palmitate, zinc stearoyl sarcosinate, zinc oleoyl sarcosinate, zinc palmitoyl sarcosinate, zinc lauroyl sarcosinate, calcium stearoyl sarcosinate, calcium oleoyl sarcosinate, calcium palmitoyl sarcosinate, calcium lauroyl sarcosinate, magnesium stearoyl sarcosinate, magnesium oleoyl sarcosinate, magnesium palmitoyl sarcosinate, magnesium lauroyl sarcosinate, nickel stearoyl sarcosinate, nickel oleoyl sarcosinate, nickel palmitoyl sarcosinate, nickel lauroyl sarcosinate, copper stearoyl sarcosinate, copper oleoyl sarcosinate, copper palmitoyl sarcosinate, copper lauroyl sarcosinate or mixtures thereof.

The acid metal salts described hereinbefore can be prepared by reacting the corresponding acid with an appropriate quantity of a compound containing the metal such as a hydroxide. If the metal is above hydrogen in the electromotive series, it can be reacted directly with the acid or acid amide. Mixtures of the foregoing metal acid salts which are available commercially can be employed if desired.

The amount of said metal salt used is sufficient to reduce the adhesion of a molded polyurethane, polyurea or like polymers prepared in the presence of the IMR composition to the walls of a mold cavity in which it is formed. Such an amount is referred to hrein as an "effective amount" of the metal salt or IMR composition. Generally, the metal salt is used in a relatively small amount, i.e. about 0.25 to 20, preferably 0.25–10, more preferably 0.5–5 percent by weight of the active hydrogen containing composition in which it is employed. It is noted, however, that certain metal acid salts are more effective than others in reducing the adhesion of the polymer to the mold. Accordingly, any particular metal acid salt may be used in an amount somewhat greater or lesser than those indicated above.

In order to facilitate blending of the IMR with a polyahl and/or polyisocyanate to form polyurethane, polyurea or like polymers, it is often desirable to to prepare a "concentrate" in which the IMR composition is dissolved or dispersed into a portion of polyahl at a somewhat higher concentration than indicated hereinbefore. Such concentrate advantageously contains about 5–40, preferably 10–40, more preferably 10–25 percent by weight of the metal salt and a compatibilizing amount of the tertiary amine compound, dissolved or dispersed into a suitable polyahl. Such concentrate is diluted with additional polyahl to prepare an active hydrogen-containing composition suitable for reaction with a polyisocyanate. The concentrate may, if desired, also contain optional additives and components such as are described hereinafter. Preferably, the polyahl and optional additives and components are substantially free of primary or secondary amines or contain same in less than an amount sufficient to compatibilize the metal salt and the polyahl.

The relative proportions of the metal salt and tertiary amine compound are chosen such that when blended into an active hydrogen-containing composition, the metal acid salt and the active hydrogen-containing composition are compatibilized by the tertiary amine compound. In terms of weight, the tertiary amine compound is preferably present in an amount from about 0.5 to 20, preferably 1 to 10, more preferably 1–5 times the weight of the metal salt, although said weight ratios depend somewhat on the molecular weights of the respective species.

In general, it is preferred to employ as little of the tertiary amine compound as possible, since the tertiary amine is a catalyst for urethane and urea-forming actions as well as for certain blowing (gas generating foaming) reactions and excess amounts thereof cause these reactions to proceed more vigorously.

The IMR composition of this invention is prepared by mixing the tertiary amine compound, the metal salt and other components if any, at a temperature above the melting point of each of the components. For many metal salts, a somewhat elevated temperature, i.e. 30°–150° C. is required to mix the tertiary amine and the metal salt due to the high melting point of the salt. Of course, the IMR composition of this invention may be formed by mixing the tertiary amine and metal salt in the presence of a polyahl, polyisocyanate, or a reaction mixture comprising a polyahl and polyisocyanate.

In addition to the metal acid salt and the tertiary amine compound, the IMR composition of this invention may contain as an optional component, a carboxylic acid, amido carboxylic acid, phosphorus-containing acid, or boron-containing acids, as are disclosed hereinbefore, but in the free acid rather than the metal salt form. The incorporation of such acids is often useful herein to further improve the release properties of the polyurethane in which it is employed. When such free carboxylic acid, amido carboxylic acid, phosphorus-containing acid or boron-containing acid is present it is advantageously present in an amount from about 0.1 to 2, preferably 0.1 to 1 times the weight of the metal acid salt.

The active hydrogen-containing composition of this invention contains in addition to the foregoing IMR composition, a polyahl, i.e., a compound or mixture of compounds containing a plurality of active hydrogen atoms. Normally the polyahl is one in which metal salt is incompatible. Preferably the active hydrogens are amine, amide, hydroxyl or thiol hydrogens, with amine and hydroxyl hydrogens being preferred and hydroxyl hydrogens being especially preferred. Most preferred are polyols or polyahl mixtures comprising a polyol which is substantially free of primary or secondary amines or contains primary or secondary amines in less than an amount sufficient to compatibilize the polyahl and the metal salt.

Suitable polyahls include polyether polyols, polyester polyols, polyhydroxyl-containing phosphorous compounds, hydroxyl-terminated acetal resins, hydroxyl terminated amines and polyamines, the corresponding amine-terminated polyether and/or polyester polyols, the so-called polymer or copolymer polyols which comprise a dispersion of an addition polymer as copolymer in a continuous polyahl phase, as well as other active hydrogen-containing compounds which are known to be useful in the preparation of polyurethanes a polymers. Examples of these and other suitable polyahls are described more fully in U.S. Pat. No. 4,394,491, particularly in columns 3–5 thereof. Suitable copolymer polyols include those described in U.S. Pat. Nos. Re. 28,118 and 4,324,491. As stated before, the polyahl is normally one in which the metal salt is incompatible.

In addition, low molecular weight polyahls may be employed herein as "chain extenders" to provide the resulting polymers with hard segments. The use of low equivalent weight polyols and polyamines as chain extenders is described, for example, in U.S. Pat. Nos. 4,269,945 and 4,444,910.

Suitable hydroxyl-containing chain extenders which are free of aliphatic amine hydrogen atoms include, for example, ethylene glycol, propylene glycol, trimethylolpropane, 1,4-butane diol, diethylene glycol, dipropylene glycol, bisphenols, hydroquinone, catechol, resorcinol, triethylene glycol, tetraethylene glycol, dicyclopentadienediethanol, glycerin, low molecular weight ethylene and/or propylene oxide derivatives of glycerin, ethylene diamine, diethylenetriamine, mixtures thereof and the like.

Suitable aliphatic amine-containing chain extenders having at least one primary amine group which can be employed herein include, for example, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethylpiperazine, 1,2-diaminocyclohexane, polyoxyalkyleneamines, bis(p-aminocyclohexyl)methane, triethylenetetramine, tetraethylenepentamine, mixtures thereof and the like.

Particularly suitable are the aminated polyoxypropylene glycols having an average amino hydrogen equivalent weight of from about 60 to about 110.

The term aliphatic amine as employed herein includes also the cycloaliphatic amines and heterocyclic aliphatic amines so long as they contain at least one primary amine group.

Suitable aromatic amines which can be employed herein as a chain extender which is essentially free of aliphatic amine hydrogen atoms include, for example, 2,4-bis(p-aminobenzyl)aniline, 2,4-diaminotoluene, 2,6-diaminotoluene, 1,3-phenylenediamine, 1,4-phenylenediamine, 2,4'-diaminodiphenylmethane, 4,4'-diaminodiphenylmethane, naphthalene-1,5-diamine, triphenylmethane-4,4',4''triamine, 4,4'-di-(methylamino)-diphenylmethane, 1-methyl-2-methylamino-4-aminobenzene, polyphenyl-polymethylene polyamines, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 4,4'-methylene-bis(2,6-diisopropylaniline), mixtures thereof and the like.

The particular polyahl(s) employed depends on the properties desired in the polymer made therewith. It is well-known that the equivalent weight, number and type of functional groups, and the like all effect the properties of polymers made therewith. In this invention, the relationship between the structure of the polyahl(s) and the properties of the resulting polymer is not significantly affected by the presence of the IMR composition. Accordingly, polyahls are used essentially in conventional manner to form polymers according to this invention.

The active hydrogen-containing composition of this invention can be prepared by adding an internal mold release composition of this invention to a suitable active hydrogen-containing material. The components of the active hydrogen-containing composition may be premixed or added individually to the polyahl to make the active hydrogen-containing composition. A "concentrate" as described hereinbefore can also be employed.

When the active hydrogen-containing composition of this invention is prepared from the internal mold release composition and a suitable polyahl, the proportions of the metal acid salt, tertiary amine compound and optionally the free acid, if present are such as to provide the active hydrogen containing composition with an effective amount of the IMR.

The active hydrogen-containing composition is suitably reacted with a polyisocyanate in a mold to form a molded polymer.

Suitable polyisocyanates include the organic aromatic polyisocyanates, aliphatic polyisocyanates or mixtures thereof.

Suitable organic aromatic polyisocyanates which can be employed herein include, for example, any such polyisocyanate having 2 or more NCO groups per molecule such as, for example, 2,4-toluenediisocyanate, 2,6-toluenediisocyanate, p,p'-diphenylmethanediisocyanate, p-phenylenediisocyanate, naphthalenediisocyanate, polymethylene polyphenylisocyanates, or mixtures thereof.

Also suitable as organic aromatic and/or aliphatic polyisocyanates are isocyanate-containing prepolymers prepared from such polyisocyanates and compounds having 2 or more active hydrogen atoms; as well as such polyisocyanates and/or prepolymers thereof which have been modified to contain uretonimine or carbodiimide linkages.

Suitable organic aliphatic polyisocyanates include, in addition to the hydrogenated derivatives of the above mentioned organic aromatic polyisocyanates, 1,6-hexamethylene diisocyanate, isophorone diisocyanate, 1,4-cyclohexyl diisocyanate, 1,4-bis-isocyanatomethylcyclohexane, or mixtures thereof.

Also suitable are the corresponding polyisothiocyanates.

The polymers can be prepared either in the presence or absence of a catalyst. Those polymers prepared from the less preferred amine-containing polyahls do not always require a catalyst although catalysts can be employed if desired. On the other hand, those polymers prepared from polyols which do not contain nitrogen atoms are usually prepared in the presence of a catalyst. The tertiary amine compound itself can be sufficient catalyst for the polymerization reaction.

Suitable catalysts which may be employed herein include, for example, organo-metal compounds, tertiary amines, alkali metal alkoxides, or mixtures thereof.

Suitable organo-metal catalysts include for example, organo-metal compounds of tin, zinc, lead, mercury, cadmium, bismuth, antimony, iron, manganese, cobalt, copper, or vanadium such as, for example, metal salts of a carboxylic acid having from 2 to 20 carbon atoms including, for example, stannous octoate, dimethyltin dilaurate, dibutyltin dilaurate, dibutyltin diacetate, ferric acetyl acetonate, lead octoate, lead oleate, phenylmercuric propionate, lead naphthenate, manganese naphthenate, copper naphthenate, vanadyl naphthenate, cobalt octoate, cobalt acetate, copper oleate, vanadium pentoxide, or mixtures thereof.

Suitable amine catalysts include, for example, triethylenediamine, triethylamine, tetramethylbutanediamine, N,N-dimethylethanolamine, N-ethylmorpholine, bis-(2-dimethylaminoethyl)ether, N-methylmorpholine, N-ethylpiperidine, 1,3-bis-(dimethylamino)-2-propanol, N,N,N',N'-tetramethylethylenediamine, or mixtures thereof.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, or mixtures thereof.

Preferably, these urethane catalysts are in liquid form, but if they are inherently solid at the application temperature, then they may be dissolved in an appropriate liquid, such as, for example, dipropylene glycol or they may be dissolved or dispersed in one of the components.

The catalysts, when employed, can be employed in quantities of from 0.001 to 2, preferably from 0.01 to 1 part per 100 parts of total polyahl employed depending upon the activity of the catalyst. Very weak catalysts could possibly be employed in quantities above 5 parts per 100 parts of polyahl.

If desired, the polyurethanes can be modified so as to contain isocyananurate or thioisocyanurate groups by employing relatively high NCO or NCS to active hydrogen ratios, e.g. greater than 1.5:1, preferably greater than 2:1, and/or employing a trimerization catalyst. Suitable trimerization catalysts which can be employed herein include, for example, the zwitterions disclosed by Kresta and Shen in U.S. Pat. No. 4,111,914 and the tertiary amines, alkali metal salts of lower alkanoic acids, or mixtures thereof as disclosed in U.S. Pat. No. 4,126,741 (Carleton et al).

The zwitterions can also function as catalysts for the polymerization reaction urethane formation.

If desired, the densities of the polymers produced herein can be reduced by incorporating a blowing agent into the formulation. Suitable such blowing agents are fully described in U.S. Pat. No. 4,125,487 and in U.S. Pat. No. 3,753,933. Particularly suitable blowing agents include, for example, water, the so-called azo blowing agents and the low boiling halogenated hydrocarbons such as methylene chloride and trichloromonofluoromethane.

Another suitable method for reducing the density is by frothing by injecting an inert gas into the mixture of urethane or other polymer forming components. Suitable such inert gases include, for example, nitrogen, oxygen, air, carbon dioxide, xenon, helium, or mixtures thereof.

If desired, cell control agents can be employed, particularly when preparing foams or microcellular products of reduced density. The use of such cell-control agents often assists in paintability of the polyurethane. Suitable cell control agents which can be employed herein include but are not limited to surfactants such as, for example, DC-193, DC-195, DC-197, DCFl-1630, DC-5043 and DC-198 commercially available from Dow Corning Corp.; SF-1034, PFA-1635, PFA-1700 and PFA-1660 commercially available from General Electric Co.; L-520, L-5320, L-5309, L-5307 and L-5340 commercially available from Union Carbide Corp.; and B-1048, B-8610, B-8612, B-8404 and B-8407 commercially available from T. H. Goldschmidt, AG., or mixtures thereof.

The polyurethanes and other polymeric products may additionally contain, if desired, coloring agents, fire retardants, fillers, or modifiers.

The components which react to form the polymeric products can be shaped or formed into useful articles by charging the reactive mixture into molds which are capable of withstanding the exotherm of the polymerizing mass and are non-reactive with and are insoluble when in contact with the liquid reactive mixture. Particularly suitable molds are those made of metal such as aluminum, copper, brass, or steel. In some instances non-metal molds can be employed such as those made of, for example, polyethylene, polypropylene, polyethylene terephthalate, or silicone elastomers, or epoxy composites. This invention is useful in any method by which a molded polyurethane, polyurea or like polymer is prepared.

Although a bare metal mold may be used herein, it is often desirable, upon beginning to prepare a series of molded parts according to this invention, to treat the mold with an external mold release agent such as a soap or a wax. Such external mold release is commonly employed befdore the first molding is made and sometimes following the first one or two moldings. After the first molding or first couple of moldings, use of an external mold release agent may be desirable periodically, i.e. after every 10–100 moldings. However, in many cases, satisfactory release is seen with the invention even when no external mold release is applied. By contrast, without the use of the IMR of the invention application of an external mold release is normally required when every molding is made.

Although the IMR of this invention is suitable for all polyurethane molding processes, it is particularly suited for the so-called reaction injection molding (RIM) processes.

Particularly suitable injection methods for RIM applications include those disclosed in a paper entitled "The Bayflex 110 Series—The New Generation of Rim Materials", by W. A. Ludwico and R. P. Taylor presented at the Society of Automotive Engineers Passenger Car Meeting, Detroit, Mich., Sept. 26–30, 1977; a paper entitled "The Properties of High Modulus Rim Urethanes", by R. M. Gerkin and F. E. Critchfield presented at the above meeting; British Pat. No. 1,534,258 titled "Process for the Production of Elastomeric Polyurethane-Polyurea Moulded Products Having a Compact Surface Skin" and a book by F. Melvin Sweeney entitled Introduction to Reaction Injection Molding, Technomics, Inc., 1979.

When injecting a relatively rapid-setting blend into massive metal molds, it may be necessary in order for the molded article to have good surface characteristics to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effect on relatively large cross section castings and thus, these thin wall metal molds may not require preheating.

Upon sufficient curing of the polymer to provide dimensional stability the polymer is removed from the mold. The force and/or time required to effect such removal is less than that required when no such IMR is employed. In addition, the mold generally does not require treatment before subsequent parts are molded therein. As stated hereinbefore, in some instances, when starting to produce a series of parts in a mold, treatment of the mold with an external mold release may be necessary to produce the first part or first few parts.

The following examples are provided to illustrate the invention but not to limit the scope thereof. All parts and percentages are by weight unless otherwise indicated.

EXAMPLE 1

Active hydrogen-containing composition Nos. I and II are prepared by blending together the components listed in Table I.

TABLE I

|  | Composition No. 1 | Composition No. 2 |
|---|---|---|
| Polyol A[1] | 45 parts by weight | 45 parts by weight |
| Diethylene glycol | 5 " | 5 " |
| Triethylene glycol | 5 " | 5 " |

TABLE I-continued

|  | Composition No. 1 | Composition No. 2 |
|---|---|---|
| Dibromoneopentyl glycol | 35 " | 35 " |
| UL-24[2] | 0.03 " | 0.03 " |
| UL-28[3] | 0.03 " | 0.03 " |
| Tertiary Amine A[4] | 25 " | — " |
| Tertiary Amine B[5] | — " | 25 " |
| Zinc Stearate | 6.5 " | 6.5 " |

[1] A triol prepared by reacting a glycerine initiator with a 92/8 propylene oxide (PO)/ethylene oxide (EO) blend, to yield a 3000 molecular weight polymer.
[2] A mercaptotin catalyst, available from Witco Chemical Corp.
[3] An organotin catalyst, available from Witco Chemical Corp.
[4] An aminoethyl ethanolamine initiated poly(propylene oxide) having a molecular weight of 278.
[5] A polyol prepared by condensing ethylene diamine with 5.5 moles of propylene oxide to yield a polymer with an 89 equivalent weight.

In both Composition Nos. I and II, the zinc stearate dissolved in the presence of the tertiary amine but not in the absence thereof.

Each of Composition Nos. I and II is reacted with a polymeric polyisocyanate sold commercially under the name "Rubinate M" at a 103 index in an Accuratio HT 60 reaction injection molding unit to form molded plaques with dimensions 10"×10"×0.125". Moldings are made with a wax basecoat (Chemtred KCT 200L) applied to the mold. The number of consecutive moldings formed which release from the mold walls on removal is as reported in Table II following. In addition, the specific gravity, flexural strength, flexural modulus, tensile strength and heat distortion temperature (66 psi and 264 psi) for the resulting moldings are determined, as reported in Table II.

TABLE II

|  | Composition No. I | Composition No. II |
|---|---|---|
| Density, g/cc | 1.18 | 1.19 |
| Flexural Strength[1] psi (kg/cm$^2$) | 10,350 (730) | 11,450 (805) |
| Flexural Modulus[1] psi (kg/cm$^2$) | 295,000 (20,740) | 300,500 (21,125) |
| Tensile Strength[2] psi (kg/cm$^2$) | 5,800 (410) | 6,500 (460) |
| Heat Distortion Temperature[3] |  |  |
| 66 PSI | 240° F. (115° C.) | 220° F. (104° C.) |
| 264 PSI | 194° F. (90° C.) | 160° F. (71° C.) |
| No. Consecutive[4] release | >15 | >15 |

[1] ASTM D-790
[2] ASTM D-638
[3] ASTM D-648
[4] Test terminated after 15 consecutive releases from the mold.

As can be seen from the data in Table II, the inclusion of the IMR of this invention in an active hydrogen containing composition provides excellent release properties and good physical properties to a polyurethane polymer produced therefrom.

EXAMPLE 2

Active hydrogen-containing compositions Nos. II-V are prepared by blending the components listed in Table III.

TABLE III

|  | Comp. No. III | Comp. No. IV | Comp. No. V |
|---|---|---|---|
| Polyol A[1] | 45 | 45 | 45 |
| Ethoxylated glycerine[2] | 50 | — | — |
| Polyol B[3] | — | 50 | — |
| Trimethylolpropane | — | — | 50 |
| Diethylene glycol | 10 | 10 | 10 |
| Dibromoneopentyl glycol | 35 | 35 | 35 |
| flame retardant[4] | 10 | 10 | 10 |
| Zinc Stearate | 5 | 5 | 5 |
| Tertiary Amine A | 5 | 5 | 5 |
| UL-24[5] | 0.03 | 0.03 | 0.03 |
| UL-28[6] | 0.03 | 0.03 | 0.03 |

[1] A trial prepared by reacting a glycerine initiator with a 92/8 propylene oxide (PO)/ethylene oxide (EO) blend, to yield a 3000 molecular weight polymer.
[2] A triol with a molecular weight of 345.
[3] A glycerine-initiated polypropylene oxide with a molecular weight of 255.
[4] Fryol RPCF, a chlorinated phosphate ester.
[5] A mercaptotin catalyst, available from Witco Chemical Corp.
[6] An organotin catalyst, available from Witco Chemical Corp.

Each of Compositions Nos. III-V is reacted with a polymeric polyisocyanate and molded as described in Example 1. The number of consecutive releases and various physical properties of the moldings are measured and are as reported in Table IV.

TABLE IV

|  | Comp. No. III | Comp. No. IV | Comp. No. V |
|---|---|---|---|
| Density, g/cc | 1.20 | 1.15 | 1.15 |
| Flexural Strength[1] psi (kg/cm$^2$) | N.D. | 12,200 (860) | 17,500 (1230) |
| Flexural Modulus[1] psi (kg/cm$^2$) | 200,000 (14,060) | 285,000 (20,035) | 335,000 (23,550) |
| Tensile Strength[2] psi (kg/cm$^2$) | N.D. | N.D. | 9,300 |
| Heat Distortion Temperature[3] |  |  |  |
| 264 psi, °F. | 200 (93° C.) | N.D. | 220 (104° C.) |
| Gardner Impact[4] strength in/lb | 30 | 25 | 40 |
| No. Consecutive[5] releases | >10 | >10 | >50 |

N.D. Not Determined
[1] ASTM D-790
[2] ASTM D-638
[3] ASTM D-648
[4] ASTM D-2794
[5] The symbol > indicates that the test is terminated after the indicated number of releases without any parts failing to release from the mold.

Each of Compositions Nos. III-V provides a polyurethane having excellent physical properties and which releases well from the mold.

EXAMPLE 3

Various active hydrogen-containing compositions like that designated Composition No. I in Example 1 are prepared, except that the zinc stearate is replaced with other fatty acid salts as indicated in Table V. In each case, the fatty acid salt dissolved in the tertiary amine-containing polyol except for the composition containing lithium stearate, in which a stable dispersion of the salt in the polyol is formed.

To study the effect of the IMR composition on the reactivity of the active hydrogen-containing composition, each of the compositions is mixed with the polymeric polyisocyanate described in Example 1, at a 103 index, and cast by hand onto a 12"×12"×¼" (300×300×12 mm) aluminum mold. The time required for the mixture to gel is as reported in Table V following. All molded polymers release easily from the mold and provide repeated releases.

TABLE V

| Composition No. | Metal Salt | Gel time, s. |
| --- | --- | --- |
| I | Zinc stearate | 14.5 |
| VI | Zinc dilaurate | 13.0 |
| VII | Calcium Stearate | 15.0 |
| VIII | Cadmium Stearate | 15.0 |
| IX | Lithium Stearate | 26 |

The foregoing results show that with the use of the IMR of the invention, unacceptably fast reaction rates are avoided.

EXAMPLE 4

Active hydrogen-containing composition No. X is prepared with the following components:

| Component | Parts By Weight |
| --- | --- |
| Polyol C[1] | 94 |
| Ethylene glycol | 5 |
| Diethylene glycol | 1 |
| Triisopropanol amine | 10 |
| Zinc laurate | 2 |

[1] A 6000 molecular weight glycerine initiated primary hydroxyl-capped poly(propylene oxide) triol.

The active hydrogen-containing composition is prepared by mixing the amine and zinc laurate at 80°–110° C., and blending the mixture with the rest of the components at room temperature. A homogeneous blend is obtained.

EXAMPLE 5

To 93 parts of Polyol D (a primary hydroxy capped glycerine initiated polypropylene oxide with a molecular weight of about 4900) are added 7 parts of tertiary amine A. This mixture is heated to about 80°–100° C. with agitation and 3 parts zinc dilaurate are added. The mixture is stirred until homogeneous, and then cooled. To the mixture are added 5 parts of a 15% dispersion of carbon black in Polyol D, 4 parts ethylene glycol, 2 parts of a 2000 molecular weight polyethylene glycol, 0.65 parts of a triethylene diamine catalyst solution and 15 parts Freon 11 blowing agent.

To 100 parts of the foregoing blend are added 35.2 parts Mondur E-448 polyisocyanate. The mixture is stirred vigorously for 2–3 seconds and dispersed into a 12"×12"33¼" bare aluminum mold which is preheated to 110°–120° F. The reacting mixture is heated in the mold at 125° F. for 3 minutes and then removed from the mold. The molded polymer removes quickly and easily from the mold. The part has a microcellular structure with an integral 3/16" thick skin.

EXAMPLE 6

To 95 parts by weight Polyol E (a glycerine-initiated, primary hydroxy-capped polypropylene oxide with a molecular weight of about 4850) are added 6 parts of tertiary amine C (the reaction product of aminoethyl piperazine with 6 moles of propylene oxide). This mixture is heated to 80° C. and 3 parts zinc laurate are stirred in. Upon obtaining a homogeneous dispersion, the mixture is cooled and 20 parts of a styrene/acrylonitrile polymer dispersion in a polyether polyol, 2.5 parts water and 0.5 parts amine catalyst are added.

Various 12"×12"×1" moldings are prepared by reacting portions of the resulting active hydrogen-containing composition with PAPI 901 polyisocyanate at a 98 index. The reaction is carried out in a bare aluminum metal mold for 4 minutes at 110° F. All parts demold easily and have good physical properties.

EXAMPLE 7

An active hydrogen containing composition is prepared from the following ingredients.

| Ingredient | Parts |
| --- | --- |
| Polyol D | 100 |
| Tertiary Amine C | 8 |
| Zinc Laurate | 4 |
| Ethylene glycol | 4 |
| Freon 11 | 15 |
| Amine catalyst | 0.15 |

The polyol D and tertiary amine C are mixed, heated to 80° C., and the zinc laurate is stirred in to form a homogeneous dispersion. The remaining components are then blended in. Successive portions of the active hydrogen containing composition are reacted with E448 polyisocyanate at a 100 index in a bare aluminum metal mold for 4 minutes at 110° F. The molded parts demold easily.

EXAMPLE 8

An active hydrogen-containing composition is prepared by mixing 30 parts of tertiary amine A, 35 parts of dibromoneopentyl glycol and two parts zinc dilaurate at about 95° C. under a nitrogen atmosphre until a solution is obtained. The solution is cooled to 65° C. and 45 parts Polyol E, 10 parts diethylene glycol and 20 parts of a neutral phosphorous polyol are added. A stable mixture is obtained. One part of a surfactant is added as well as 4 parts of an amine terminated polyol of about 400 molecular weight to impart green strength to a molded part prepared therewith.

The resulting active-hydrogen-containing composition is reaction-injection molded on an Accuratio ASI UR HI-60 machine at a 1.03 index using Rubinate M on the polyisocyanate. The mold temperature is about 135°–150° F. Mold time is two minutes. A ⅛"×10"×10" (3×250×250 mm) mold is used. After 13 consecutive moldings readily release from the mold, the test is discontinued. All molding exhibits good physical properties.

What is claimed is:

1. An internal mold release composition comprising (a) a metal salt of a carboxylic acid, amido carboxylic acid, phosphorus-containing acid or boron-containing acid wherein (i) the acid contains a lipophilic group which renders it incompatible with a polyahl and (ii) the metal is chosen from the metals in Groups IA, IB, IIA and IIB of the Periodic Table of the Elements, aluminum, chromium, molybdenum, iron, cobalt, nickel, tin, lead, antimony or bismuth and (b) a compatibilizing amount of a tertiary amine compound containing at least one tertiary nitrogen, which tertiary amine compound is a compatibilizer for the said metal salt in an active hydrogen-containing composition comprising said polyahl, but does not compatibilize the metal acid salt in a reacting mixture comprising said hydrogen-containing composition and a polyisocyanate.

2. The internal mold release composition of claim 1 wherein the acid comprises a fatty acid.

3. The internal mold release composition of claim 2 wherein the metal acid salt is a zinc, calcium, cadmium, lithium or nickel salt of stearic, lauric, oleic, or palmitic acid.

4. The internal mold release composition of claim 1 wherein the tertiary amine compound has one or more hydroxy-terminated poly(oxyalkylene) or alkanol groups attached to a tertiary nitrogen atom.

5. The internal mold release composition of claim 4 wherein the tertiary amine compound comprises a monoamine represented by the structure $$R'_{(3-n)}N[(CH_2CHRO)_xH]_n$$

wherein x is a number between 1–5, n is 2 or 3, each R is independently hydrogen, halogen or inertly substituted lower alkyl and R' is an inertly substituted lower alkyl group or phenyl group.

6. The internal mold release composition of claim 5 wherein the tertiary amine compound is chosen from the group consisting of triethanol amine, alkyl diethanol amine, alkyl di(isopropanol)amine and tri(isopropanol)amine.

7. The internal mold release composition of claim 4 wherein the tertiary amine compound comprises a diamine represented by the structure $$[H(OCHRCH_2)_y]_m \overset{R'_{(2-m)}}{\underset{|}{N}} - R^2 - \overset{R'_{(2-m)}}{\underset{|}{N}} [(CH_2CHRO)_yH]_m \quad (II)$$

wherein each R' is independently an inertly substituted alkyl or phenyl group, each y is independently a number from about 1–50, $R^2$ is an inertly substituted alkylene, dialkylene ether or polyether diradical, and each m is 1 or 2.

8. The internal mold release composition of claim 7 wherein the tertiary amine compound is the reaction product of an alkylene diamine, a hydroxyethyl alkylene diamine or an amine-terminated polyether with about 1–30 moles of an alkylene oxide per amine hydrogen.

9. The internal mold release agent of claim 8 wherein the tertiary amine compound is a reaction product of ethylene diamine or hydroxyethyl ethylene diamine and 1–3 moles of propylene oxide or a mixture of propylene oxide and ethylene oxide per equivalent of amine hydrogen.

10. The internal mold release composition of claim 4 wherein the tertiary amine comprises a reaction product of piperazine and about 1–3 moles of a $C_2$–$C_4$ alkylene oxide per equivalent of amine hydrogen.

11. The internal mold release composition of claim 4 wherein the tertiary amine comprises the reaction product of an aminoalkyl piperazine or bis(aminoalkyl)piperazine and about 1–20 moles of a $C_2$–$C_4$ alkylene oxide per mole of aminoalkyl piperazine or bis(aminoalkyl)piperazine.

12. The internal mold release composition of claim 4 wherein the tertiary amine comprises an N,N',N" hydroxyalkyl triazine.

13. The internal mold release composition of claims 1, 2, 6, 9, 10, 11 or 12 containing about 1–10 parts by weight of the tertiary amine compound per part by weight of the metal salt.

14. The internal mold release composition of claim 13, further comprising a polyahl, such that the composition contains from about 5–40 percent by weight of the composition of the metal salt.

15. The internal mold release composition of claim 14 which contains less than an amount of a primary or secondary amine which is sufficient to compatibilize the metal salt and a polyahl.

16. An active hydrogen containing composition comprising
   (a) a polyahl having dispersed or dissolved therein
   (b) an effective amount of an internal mold release composition comprising
      (i) a metal salt of a carboxylic acid, amido carboxylic acid, phosphorous-containing acid or boron-containing acid wherein the acid contains a lipophilic group which renders it incompatible with the polyahl and a metal chosen from the metals in Groups IA, IB, IIA and IIB of the Periodic Table of the Elements, aluminum, chromium, molybdenum, iron, cobalt, nickel, tin, lead, antimony or bismuth and
      (ii) a compatibilizing amount of a tertiary amine compound containing at least one tertiary nitrogen, which tertiary amine compound is a compatibilizer for the said metal salts in said polyahl, but does not compatibilize the metal carboxylic acid salt in a reaction mixture comprising said hydrogen-containing composition and a polyisocyanate.

17. The active hydrogen containing composition of claim 16 wherein the carboxylic acid comprises a fatty acid.

18. The active hydrogen containing composition of claim 16 wherein the tertiary amine compound has one or more hydroxy-terminated poly(oxyalkylene) or alkanol groups attached to a tertiary nitrogen atom.

19. The active hydrogen-containing composition of claim 18 wherein the tertiary amine compound is chosen from the group consisting of triethanol amine, alkyldiethanol amine, alkyl di(2-propanol) amine and tri(2-propanol amine).

20. The active hydrogen containing composition of claim 18 wherein the tertiary nitrogen compound comprises a reaction product of an alkylene diamine or an amine-terminated polyether with about 1–20 moles of an alkylene oxide per amine hydrogen.

21. The active hydrogen-containing composition of claim 18 wherein the tertiary amine compound comprises a reaction product of piperazine and about 2–6 moles of a $C_2$–$C_4$ alkylene oxide.

22. The active hydrogen containing composition of claim 18 wherein the tertiary amine compound comprises a reaction product of an aminoalkylpiperazine or a bis(aminoalkyl)piperazine and about 1–20 moles of a $C_2$–$C_4$ alkylene oxide.

23. The active hydrogen containing composition of claims 16, 17, 19, 20, 21 or 22 containing about 0.5–5 percent by weight of the composition of said metal salt.

24. The active hydrogen containing composition of claim 16 further comprising a catalyst for a reaction between said polyahl and a polyisocyanate.

25. The active hydrogen containing composition of claim 16 wherein sand polyahl comprises a polyol.

26. The active hydrogen-containing composition of claim 25 wherein the polyahl is substantially devoid of aliphatic amine hydrogens.

27. A molded polymer prepared by the reaction of the active hydrogen containing composition of claim 23 with a polyisocyanate in a mold.

28. A molded polymer prepared by reacting (a) a polyahl and (b) a polyisocyanate in the presence of an amount of the internal mold release agent of claim 1 sufficient to improve the release properties of the polymer.

29. The internal mold release composition of claim 1 wherein said metal salt comprises about 0.25 to about 10 percent by weight of the composition, and said tertiary amine compound is present in an amount from about 1 to about 10 times the weight of said metal salt.

30. The active hydrogen-containing composition of claim 16 wherein the weight ratio of said tertiary amine compound to said metal salt is about 0.5 to about 20.

31. The active hydrogen-containing composition of claim 30 wherein the metal salt comprises about 0.25 to about 10 percent by weight of said composition.

* * * * *